US009564743B2

(12) United States Patent
Tanaka (10) Patent No.: US 9,564,743 B2
(45) Date of Patent: Feb. 7, 2017

(54) TERMINAL BOX AND METHOD OF CONNECTING OUTPUT LINE

(71) Applicant: Hosiden Corporation, Yao-shi (JP)

(72) Inventor: Toshiya Tanaka, Yao (JP)

(73) Assignee: Hosiden Corporation, Osaka (JP)

( * ) Notice: Subject to any disclaimer, the term of this patent is extended or adjusted under 35 U.S.C. 154(b) by 34 days.

(21) Appl. No.: 14/800,019

(22) Filed: Jul. 15, 2015

(65) Prior Publication Data
US 2016/0020591 A1 Jan. 21, 2016

(30) Foreign Application Priority Data

Jul. 18, 2014 (JP) ................................. 2014-147904

(51) Int. Cl.
  *H02S 40/34* (2014.01)
  *H02G 3/08* (2006.01)
  *H02G 1/00* (2006.01)

(52) U.S. Cl.
  CPC ................ *H02G 3/083* (2013.01); *H02G 1/00* (2013.01); *H02S 40/34* (2014.12)

(58) Field of Classification Search
  CPC .............................. H01S 40/34; H05K 5/0247
  See application file for complete search history.

(56) References Cited

U.S. PATENT DOCUMENTS

| 7,618,265 B2 * | 11/2009 | Rueggen | H01R 4/4809 439/259 |
| 7,972,177 B2 * | 7/2011 | Richter | H01R 13/17 136/244 |
| 8,287,300 B2 * | 10/2012 | Yamazaki | H02S 40/34 439/441 |
| 8,308,504 B2 * | 11/2012 | Ackermann | H02S 40/34 439/496 |
| 8,353,725 B2 * | 1/2013 | Ebihara | H01R 4/185 439/626 |
| 8,410,359 B2 * | 4/2013 | Richter | H02G 3/083 174/50 |
| 8,678,864 B2 * | 3/2014 | Yoshikawa | H02S 40/34 439/620.21 |

(Continued)

FOREIGN PATENT DOCUMENTS

| EP | 2423978 A2 | 2/2012 |
| EP | 2492969 A1 | 8/2012 |
| JP | 4384241 B1 | 12/2009 |

*Primary Examiner* — Hung V Ngo
(74) *Attorney, Agent, or Firm* — The Webb Law Firm (57) ABSTRACT

A terminal box that stably and surely provides a required length of play in an output line, and a method of connecting the output line. The terminal box includes a terminal strip connected to the output line, and a main body housing the terminal strip. The terminal strip includes a connecting portion electrically connected to the output line, and a play producing portion. The play producing portion has an opening receiving the output line. The main body includes a receiving hole formed at a position corresponding to the opening for receiving the output line. The play producing portion inclines relative to the connecting portion by a first angle with the output line being inserted through the receiving hole and the opening to be connected to the connecting portion, and by a second angle smaller than the first angle with the output line being connected to the connecting portion.

5 Claims, 6 Drawing Sheets (56) References Cited

U.S. PATENT DOCUMENTS

| | | | |
|---|---|---|---|
| 8,866,013 B2* | 10/2014 | Masumoto | H02S 40/34 |
| | | | 136/251 |
| 8,900,019 B2* | 12/2014 | Yamaguchi | H01R 13/432 |
| | | | 439/747 |
| 9,028,262 B2* | 5/2015 | Deng | H01R 43/18 |
| | | | 439/76.1 |
| 2004/0261835 A1 | 12/2004 | Utsunomiya et al. | |
| 2010/0173511 A1 | 7/2010 | Giefers | |
| 2011/0073362 A1 | 3/2011 | Shimizu | |
| 2012/0052719 A1* | 3/2012 | Xue | H02G 3/16 |
| | | | 439/485 |
| 2014/0053892 A1* | 2/2014 | Seol | H02S 50/00 |
| | | | 136/251 |
| 2014/0196945 A1* | 7/2014 | Kato | H01L 31/02013 |
| | | | 174/522 |

* cited by examiner

TERMINAL BOX AND METHOD OF CONNECTING OUTPUT LINE

CROSS REFERENCE TO RELATED APPLICATION

This application claims priority to Japanese Patent Application No. 2014-147904 filed Jul. 18, 2014, the disclosure of which is hereby incorporated in its entirety by reference.

TECHNICAL FIELD

This disclosure relates to a terminal box, and a method of connecting an output line that takes out electric power generated at a solar cell module.

RELATED ART

A solar power generation system converts DC power, which is generated at a plurality of solar cell modules laid on a roof of a building, to AC power with a power conditioner (inverter) to supply the AC power to various electric appliances. The plurality of solar cell modules are serially connected to each other with external cables through terminal boxes disposed at back surfaces of the solar cell modules.

Such a terminal box typically includes a main body opening upward, and a plurality of terminal strips arranged in the main body for connecting a positive output line and a negative output line of the solar cell module as well as an output cable, and a bypass diode disposed between the terminal strips.

Japanese Patent No. 4,384,214 discloses a terminal box for attaching and fixing an output lead (output line) extending from a back surface of a solar cell string (solar cell module) to a terminal base (terminal strip) placed within a main body. The output lead introduced into the main body from the outside is inserted through an opening of the terminal base and pressed against an edge of the opening to be bent toward one edge portion of the terminal base. Then, a distal end portion of the bent lead is pressed against the one edge portion of the terminal base to be bent downward and turned back to engage the lead with the terminal base. The output lead is eventually fixed to the terminal base by soldering.

SUMMARY

The output line of the solar cell module may be influenced by a change in ambient temperature and shrunken or expanded in a longitudinal direction with the output line being electrically connected to the terminal strip disposed in the terminal box. In this state, the output line should be connected to the terminal strip with an extra length or a certain length of "play" for absorbing the shrinkage or expansion to avoid stress applied on a connection between the output line and the terminal strip, which otherwise results in poor contact therebetween. With the terminal box disclosed in Japanese Patent No. 4,384,241, for example, the output lead might crack or peel off at the soldered connection by shrinkage or expansion if the output lead is connected to the terminal base with no play, which results in contact failure.

To eliminate such contact failure, an operator working at a job site may create play in the output line to be connected to the terminal strip. In that case, however, the operator may forget to create such play in the output line or may produce variations in creating the play. Thus, the contact failure still might occur if the operator connects the output line to the terminal strip without creating the play or with shortage of play.

Embodiments of this disclosure provide a terminal box and a method of connecting an output line for stably and surely yielding a required length of play.

According to one embodiment of this disclosure, a terminal box includes a terminal strip connected to an output line that takes out electric power generated at a solar cell module, and a main body housing the terminal strip. The terminal strip includes a connecting portion electrically connected to the output line, and a play producing portion extending in a direction opposite the connecting portion from a support part provided in an end portion of the connecting portion. The play producing portion has an opening receiving the output line. The support part acts as a support point at which the play producing portion changes its angle relative to the connecting portion. The main body includes a receiving hole formed at a position corresponding to the opening for receiving the output line. The play producing portion inclines relative to the connecting portion by a first angle with the output line being inserted through the receiving hole and the opening to be connected to the connecting portion. The play producing portion inclines relative to the connecting portion by a second angle smaller than the first angle with the output line being connected to the connecting portion.

With such an embodiment in which the terminal strip includes the connecting portion and the play producing portion, the play producing portion inclines relative to the connecting portion by the first angle to connect and fix the output line to the connecting portion. Then, the play producing portion is moved to incline relative to the connecting portion by the second angle smaller than the first angle with the output line being connected to the connecting portion to easily and surely provide a certain length of paly in the output line. While the operator working at a job site who attempts to manually create play in the output line might forget to create such play or might produce variations in creating the play, the arrangement according to the current embodiment eliminates such a disadvantage and stably maintains the good quality of the terminal box when attached to the solar cell module. Further, the operator may visually recognize that the play producing portion inclines relative to the connecting portion by the first angle or by the second angle to easily confirm that the play is surely provided.

According to one embodiment of this disclosure, the play producing portion has a cantilever shape with the support part being a fixed end, and has a width smaller at the support part than a width at a part forming the opening.

With such an embodiment, the part forming the opening is depressed to largely change the angle of the play producing part relative to the connecting portion with the support part being a pivotal point or fulcrum. Further, the width at the support part is smaller than the width at the part forming the opening, which only requires a small force to change the angle. Thus, the play producing portion can change its angle without being strained or distorted.

According to one embodiment of this disclosure, the opening is rectangular and has a guide part formed in one of four sides of the opening that is closest to the connecting portion for guiding the output line to the connecting portion.

The output line is inserted into the receiving hole and the opening and then bent when passing through the opening to extend to the connecting portion along the play producing portion. In this time, the output line is bent in contact with one of the four sides of the opening that is closest to the connecting portion and thus might be damaged or marred if the side contacting the output line creates a sharp edge. In view of this, the guide part is formed at the side closest to the connecting portion to smoothly bend the output line to be guided to the connecting portion.

One embodiment of this disclosure also provides a method of connecting an output line that takes out electric power generated at a solar cell module to a terminal strip housed in a main body included in a terminal box. In the terminal box, the terminal strip includes a connecting portion electrically connected to the output line, and a play producing portion extending in a direction opposite the connecting portion from a support part provided in an end portion of the connecting portion. The play producing portion has an opening receiving the output line. The support part acts as a support point at which the play producing portion changes its angle relative to the connecting portion. The main body includes a receiving hole formed at a position corresponding to the opening for receiving the output line. The method includes the steps of inserting the output line through the receiving hole and the opening to connect the output line to the connecting portion with the play producing portion inclining relative to the connecting portion by a first angle, and moving the play producing portion relative to the connecting portion by a second angle smaller than the first angle to produce play in the output line.

With such an embodiment in which the terminal strip includes the connecting portion and the play producing portion, the play producing portion inclines relative to the connecting portion by the first angle to connect and fix the output line to the connecting portion, and then moved to incline relative to the connecting portion by the second angle smaller than the first angle to easily and surely provide a certain length of paly in the output line. While the operator working at a job site who attempts to manually create play in the output line might forget to create such play or might produce variations in creating the play, the arrangement according to the current embodiment eliminates such a disadvantage and stably maintains the good quality of the terminal box when attached to the solar cell module. Further, the operator may visually recognize that the play producing portion inclines relative to the connecting portion by the first angle or by the second angle to easily confirm that the play is surely provided.

DESCRIPTION OF EMBODIMENTS

1. Overall Construction of Terminal Box

Figure 1:
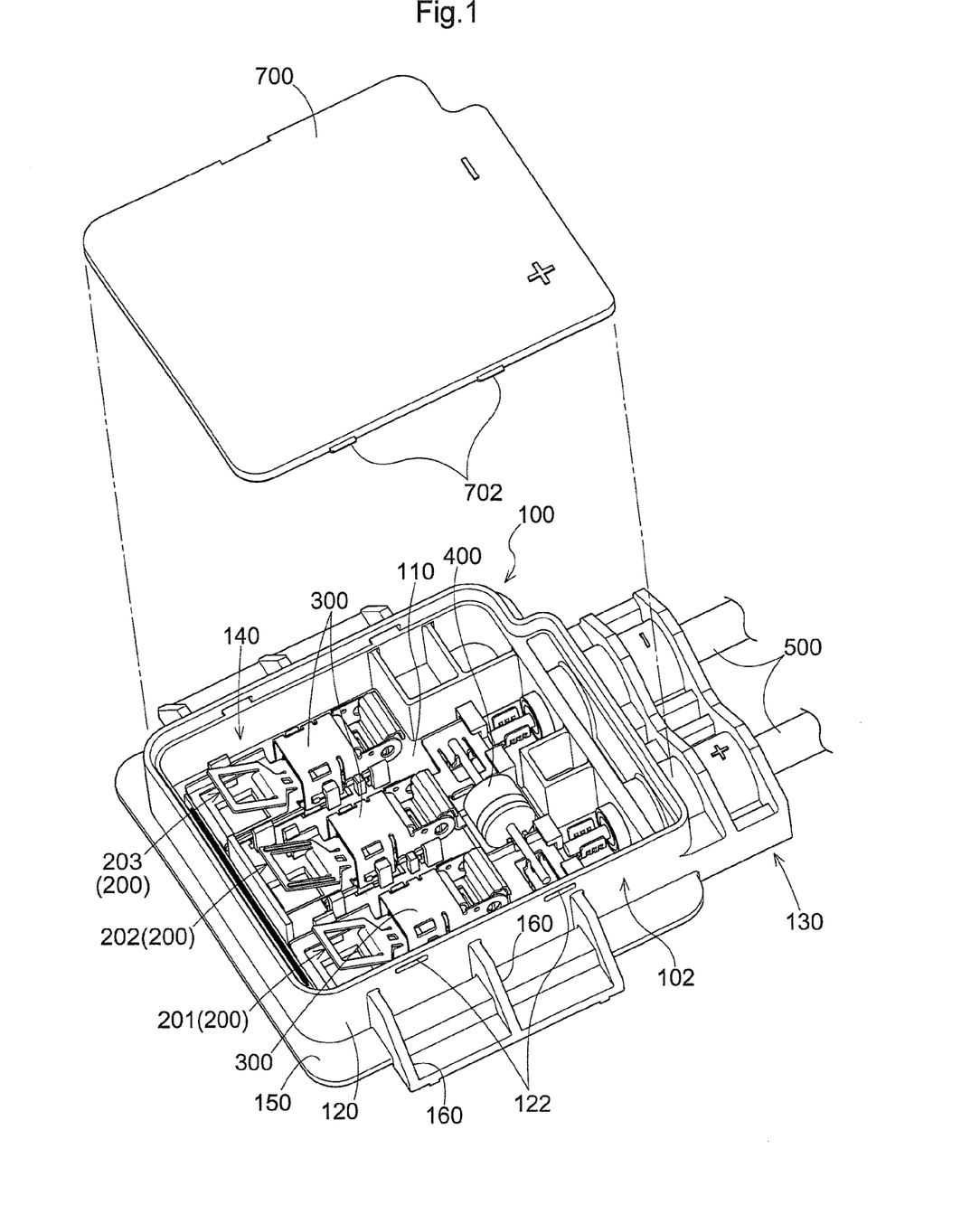
FIG. 1 is a perspective view of a terminal box according to one embodiment.

Embodiments of a terminal box relating to this disclosure will be described in detail in reference to the accompanying drawings. Referring to FIG. 1, the terminal box includes a main body 100, a lid 700, three terminal strips 200 provided inside of the main body 100, three connecting elements 300, a diode 400, and output cables 500. The main body 100 and the lid 700 are made of insulating resin, and the terminal strips 200 and the connecting elements 300 are made of metal such as copper alloy. The main body 100 has a substantially box shape having an upper opening. The upper opening of the main body 100 is closable with the lid 700. The three terminal strips 200 will be referred to as a first terminal strip 201, a second terminal strip 202, and a third terminal strip 203 hereinafter, when needed to be distinguished from each other.

The main body 100 includes a housing section 102 and a cable retaining section 130. The cable retaining section 130 has two through bores (not shown). The positive and negative output cables 500 are inserted into the two through bores, respectively, and fixed to the main body 100 via cable retainers (not shown). In the following description, a side of the main body 100 near the cable retaining section 130 is defined as "rear," the side opposite the rear is defined as "front," the opening side is defined as "upper side," and the side opposite the upper side is defined as "lower side." A direction perpendicular to the front-rear direction and the upper-lower direction (vertical direction), in which the terminal strips 200 are arranged, is defined as "lateral direction."

The housing section 102 includes a bottom wall 110, and side walls 120 extending upright from peripheries of the bottom wall 110 to surround the inside of the housing section on three sides. A housing space 140 is defined by the bottom wall 110, the side walls 120, and a front end wall of the cable retaining section 130. This arrangement allows the housing section 102 to have the substantially box shape with the upper opening. The three terminal strips 200, the three connecting elements 300, and the diode 400 are accommodated in the housing space 140. The terminal strips 200 are intervening components for electrically connecting output lines 600 that take out electric power generated at a solar cell module (not shown) to the output cables 500 to output the electric power from the output cables 500. The constructions of the terminal strips 200 and the connecting elements 300 will be described in more detail later. The output lines 600 are each a band-shaped metal terminal as shown in FIGS. 6 to 9.

Figure 2:
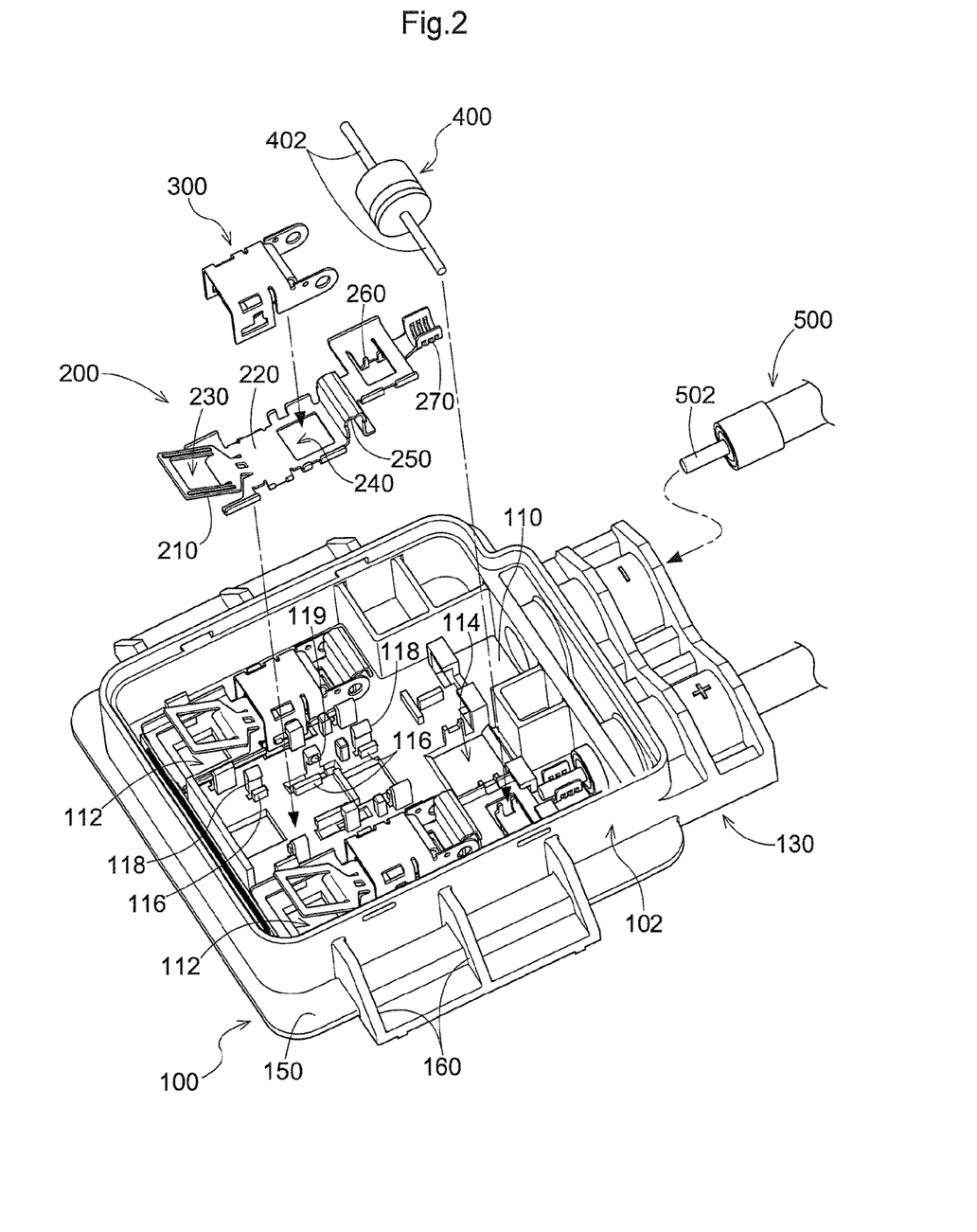
FIG. 2 is an exploded perspective view of the terminal box with some components such as terminal strips being removed from a housing section.

Referring to FIG. 2, a plurality of projections 116 and a plurality of pawls 118 are formed on the top surface of the bottom wall 110. The terminal strips 200 are each supported by the projections 116 and fixed by the pawls 118. More particularly, each of the terminal strips 200 is spaced apart from the top surface of the bottom wall 110 by a height of the projections 116.

Referring back to FIG. 1, the bottom wall 110 extends outward from the front and right and left lateral side walls 120 to form a flange 150. Ribs 160 are formed to extend between the top surface of the flange 150 and an outer surface of the side walls 120 to increase the strength of the flange 150. Two engaging holes 122 are formed in the vicinity of an upper edge of each of the right and left side walls 120.

Figure 3:
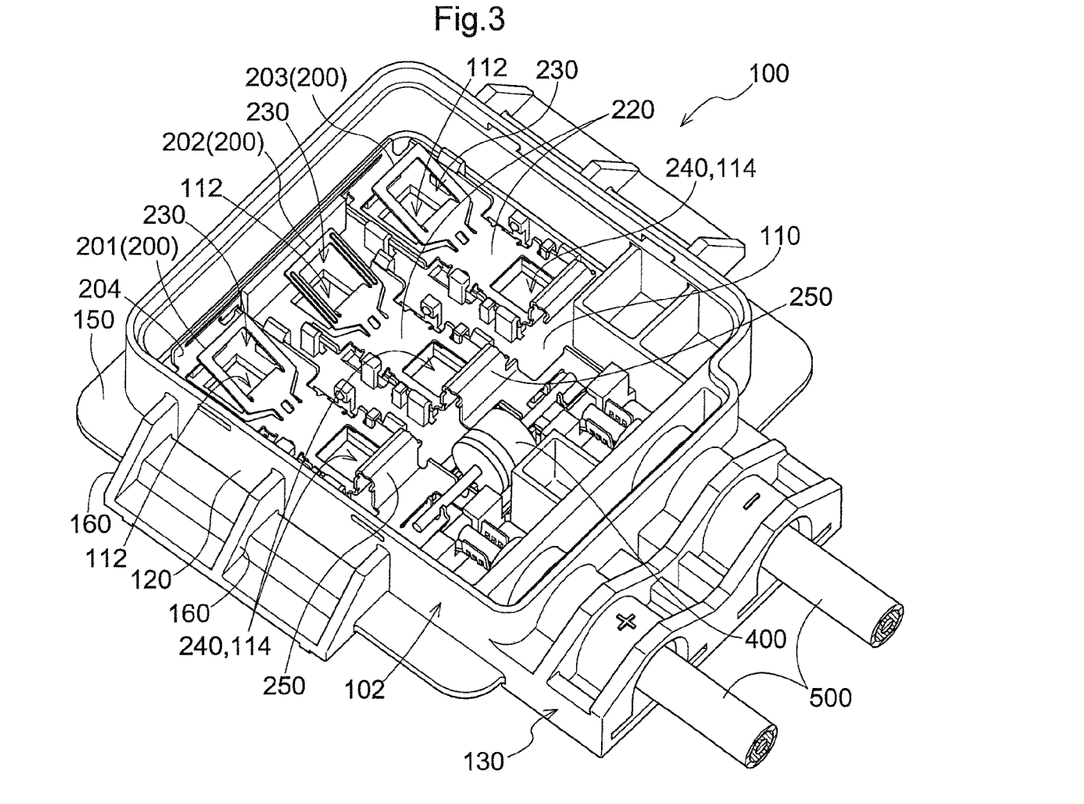
FIG. 3 is a perspective view of the terminal box with connecting elements being removed from the housing section.

As shown in FIG. 3, in the bottom wall 110 of the main body 100, three first tab receiving holes 112 that are rectangular through holes are arranged in a lateral direction at a front side of the main body 100 and three second tab receiving holes 114 that are also rectangular through holes are arranged in the lateral direction at a rear side of the main body 100. Each of the output lines 600 of the solar cell module extends through the corresponding first tab receiving hole 112 or second tab receiving hole 114 and is introduced into the housing space 140. The first tab receiving hole 112 is one example of a receiving hole.

Referring back to FIG. 1, the lid 700 is a flat plate element for closing the upper opening of the housing section 102. The shape of the lid 700 matches with the shape of the housing section 102 as viewed from the top, which is substantially rectangular in the current embodiment. The lid 700 forms an upper wall of the terminal box in the current embodiment.

Two engageable pawls 702 are formed in each of right and left side surfaces of the lid 700 to project sideways. The engageable pawls 702 are fitted into the engaging holes 122 formed in the side walls 120 to fixedly engage the lid 700 with the main body 100.

The first terminal strip 201 and the third terminal strip 203 of the three terminal strips 200 disposed at the lateral opposite sides act as positive terminal strips, and the second terminal strip 202 of the terminal strips 200 disposed at the center acts as a negative terminal strip. The first terminal strip 201 and the third terminal strip 203 are conductive with each other through a connecting strip 204 shown in FIG. 3. The positive output cable 500 is connected to the first terminal strip 201 and the negative output cable 500 is connected to the second terminal strip 202. The third terminal strip 203 is designed not to receive the output cable 500.

Figure 4:
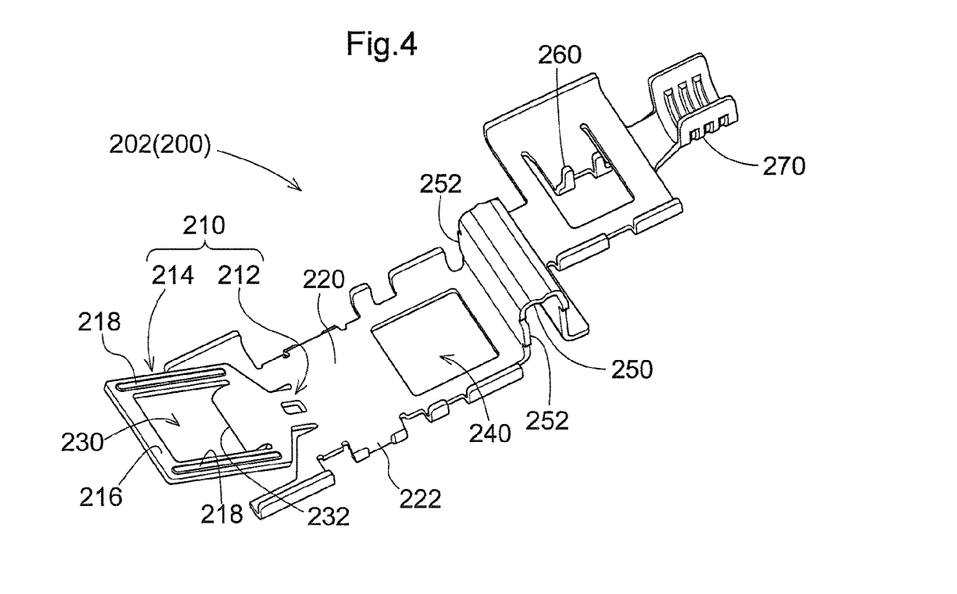
FIG. 4 is a perspective view of one of the terminal strips.

Referring to FIG. 4, the terminal strip 200 includes a play producing portion 210, a receiving portion 220, a first opening 230, a second opening 240, an elastically deformable portion 250, a diode connecting portion 260, and a cable receiving portion 270. The receiving portion 220 is a flat surface having a predetermined area. A leading end of the output line 600 rests on the receiving portion to be electrically connected to the terminal strip 200. The receiving portion 220 is one example of a connecting portion, and the first opening 230 is one example of an opening.

The second opening 240 is a rectangular through opening formed rearward of the receiving portion 220 to align with the second tab receiving hole 114 as viewed from the top with the terminal strip 200 being attached to the main body 100.

The elastically deformable portion 250 is provided rearward of the second opening 240 to have an inversed U-shaped section when taken along a front-rear direction of the terminal strip 200. The elastically deformable portion 250 is deformable to vary the inversed U-shaped space to vary in turn the length of the terminal strip 200 in the front-rear direction. With this arrangement, when the terminal strip 200 is influenced by a change in external temperature or other factors and shrinks or expands in the front-rear direction (longitudinal direction), the elastically deformable portion 250 absorbs the shrinkage or expansion of the terminal strip 200 to prevent the projections 116 and the pawls 118 provided in the main body 100 from being stressed and broken.

The diode connecting portion 260 is formed rearward of the elastically deformable portion 250. The diode connecting portion 260 and the cable receiving portion 270 that will be described in more detail later are formed only in the first terminal strip 201 and the second terminal strip 202 and not formed in the third terminal strip 203. The diode connecting portion 260 has a cutout that is open in the lateral direction to fittingly receive a laterally extending terminal 402 of the diode 400 (see FIG. 2). This arrangement holds the diode 400 maintaining the electrical connection between the diode 400 and the first terminal strip 201 or the second terminal strip 202.

The diode 400 is a bypass diode that functions to supply an electric current bypassing a dysfunctional solar cell module that is shaded, for example, and no longer able to generate electric power. This arrangement prevents decrease of the power generation performance of the whole system resulting from the dysfunctional solar cell as an electrical load.

The cable connecting portion 270 exhibits a U-shaped section when the terminal strip 200 is taken along the lateral direction to receive a cable core 502 of the output cable 500. The cable core 502 is enclosed with the U-shaped portion to be crimped, thereby to electrically connect the terminal strip 200 to the output cable 500.

The play producing portion 210 is formed forward of the receiving portion 220. The play producing portion 210 has a support part 212 formed at the rearmost position thereof with two bridges continuously extending in the front-rear direction from the receiving portion 220, and a swingable part 214 formed forward of the support part 212 and having a flat surface to be vertically pivotable about the support part 212. In short, the play producing portion 210 is shaped as a cantilever with the support part 212 being a fixed end. This configuration allows the swingable part 214 to move largely or extensively with the support part 212 being a pivot point or fulcrum.

The play producing portion 210 has a racket shape decreasing its lateral width progressively from the swingable part 214 to the support part 212. This configuration prevents stress from concentrating on a boundary between the swingable part 214 and support part 212 to move the swingable part 214 and support part 212 in unison. Also, only a small force is required to move the swingable part 214.

Figure 7:
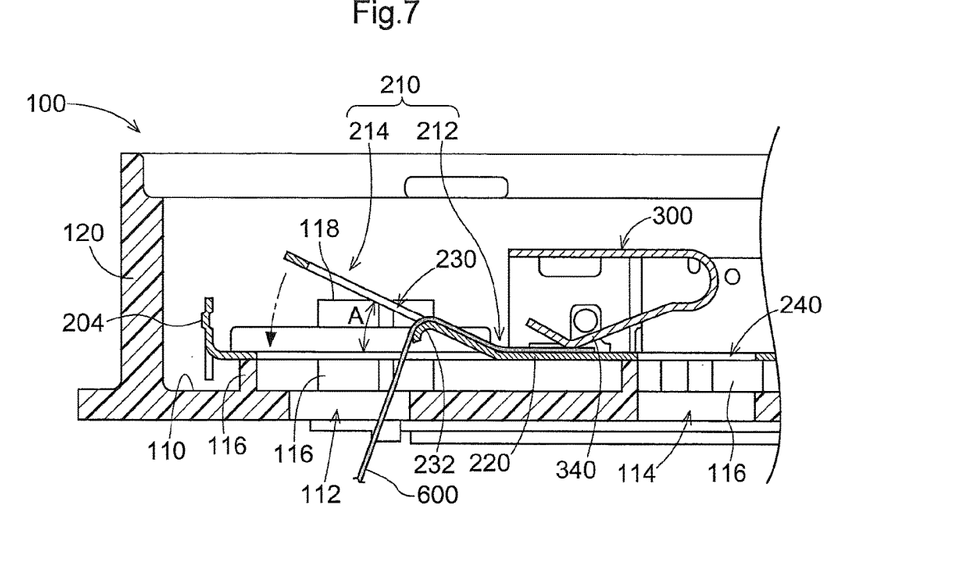
FIG. 7 is a sectional view taken on line VII-VII of FIG. 6.

In an initial state, the swingable part 214 inclines upward from the receiving portion 220 by a first angle A (e.g., 30 degrees) (see FIG. 7). The first angle A is an acute angle formed by the flat surface of the receiving portion 200 and the flat surface of the swingable part 214.

The rectangular first opening 230 is formed in a central part of the swingable part 214 and surrounded by a frame 216. The first opening 230 is aligned with the first tab receiving hole 112 as viewed from the top with the terminal strip 200 being mounted on the main body 100 and with the swingable part 214 being parallel with the receiving portion 220. One of the four sides of the first opening 230 that is closest to the support part 212 has a guide part 232 bending toward the first tab receiving hole 112 to introduce the output line 600 smoothly into the housing space 140 remaining intact.

The play producing portion 210 of the second terminal strip 202 has protrusions 218 formed at lateral opposite sides of the frame 216 to project upward. The protrusions 218 are formed by press working performed on the frame 216. The first angle A formed by the swingable part 214 and the receiving portion 220, which will be described in more detail later, is maintained until the output line 600 is connected to the terminal strip 200. When the output line 600 is connected to the terminal strip 200, the frame 216 is depressed to pivot the swingable part 214 about the support part 212 to allow the swingable part 214 to be substantially parallel with the receiving portion 220. To this end, the frame 216 needs to have sufficient strength so as not to be strained or distorted when depressed. The protrusions 218 provide the frame 216 with such strength.

Apart from the current embodiment, the protrusions 218 may be formed on a laterally extending foremost part of the frame 216, and further may be formed on the first terminal strip 201 and the third terminal strip 203. On the other hand, the protrusions 218 are dispensable if the frame 216 can be robust enough without the protrusions 218. Dispensing with the protrusions 218 could reduce the manufacturing costs for the terminal strip 200.

The play producing portion 210 is shaped with its lateral width gradually decreasing from the swingable part 214 to the support part 212 in the current embodiment, but may be shaped otherwise. For example, the swingable part 214 may not continue progressively from the support part 212 but may have a rectangular outer configuration having one side from which the support part 212 extends. Alternatively, the swingable part 214 may have a circular outer configuration.

The first opening 230 is rectangular in the current embodiment, but may be circular. The swingable part 214 and the first opening 230 may have any suitable shape.

Figure 5:
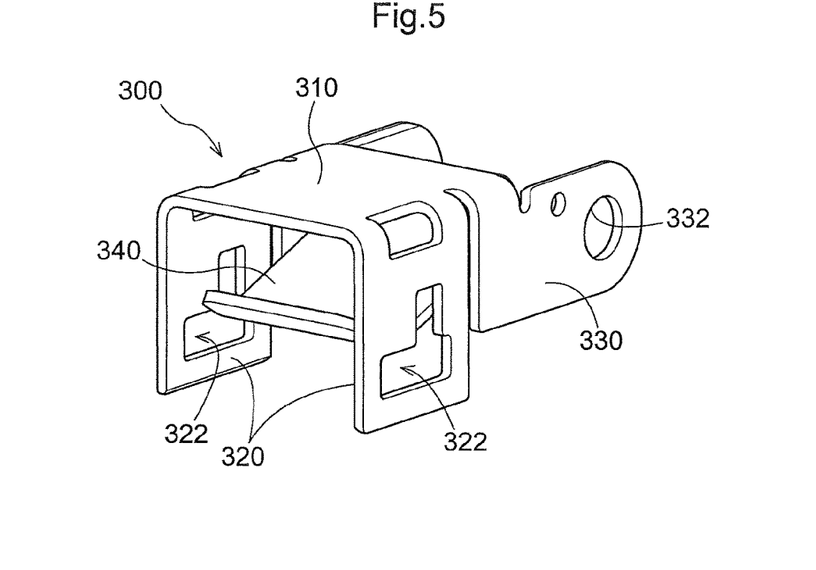
FIG. 5 is a perspective view of one of the connecting elements.

The connecting element 300 is provided for pressing the leading end of the output line 600, which is introduced into the housing space 140 through the first tab receiving hole 112 and the first opening 230 or through the second tab receiving hole 114 and the second opening 240, against the receiving portion 220 to fix the output line 600 to the receiving portion 220 to establish the electric connection therebetween. Referring to FIG. 5, the connecting element 300 includes a top 310, sides 320 suspended from lateral opposite ends of the top 310, and a projecting portion 330 having a side surface suspended from the top 310 and extending rearward to be flush with the side 320. The projecting portion 330 has a receiving hole 332.

The elastically deformable portion 250 of the terminal strip 200 has projections 252 laterally protruding from the receiving portion 220 (see FIG. 4) engaged with the receiving holes 332 in attaching the connecting element 300 to the terminal strip 200. This allows the connecting element 300 to be pivotable relative to the terminal strip 200 about the receiving holes 332 engaged with the projections 252. Thus, the connecting element 300 is switchable between a fixed position (see the first terminal strip 201 in FIG. 6) in which the receiving portion 220 comes into contact with an urging element 340 that will be described in more detail later, and an open position (see the second terminal strip 202 in FIG. 6) in which the receiving portion 220 is moved away from the urging element 340.

L-shaped engageable holes 322 are formed in the sides 320 to engage with engaging parts 222 laterally protruding from the receiving portion 220 (see FIG. 4) and round projections 119 (see FIG. 2) provided in the main body 1 with the connecting element 300 being brought to the fixed position, thereby to maintain the connecting element 300 in the fixed position.

The urging element 340 is provided in a space defined by the top 310 and the sides 320. The urging element 340 is formed by a rear end part of the top 310 that is bent inward and downward to be elastic. The urging element 340 applies an urging force to press the output line 600 against the receiving portion 220 when the connecting element 300 is switched from the open position to the fixed position with the output line 600 resting on the receiving portion 220 of the terminal strip 200. This arrangement allows the output line 600 to be fixedly held between the terminal strip 200 and the connecting element 300 and to be electrically connected to the terminal strip 200.

2. Method of Connecting Output Tab

Next, a method of connecting the output line 600 of the solar cell module to the terminal strip 200 in the main body 100 will be described hereinafter in reference to the accompanying drawings.

Figure 6:
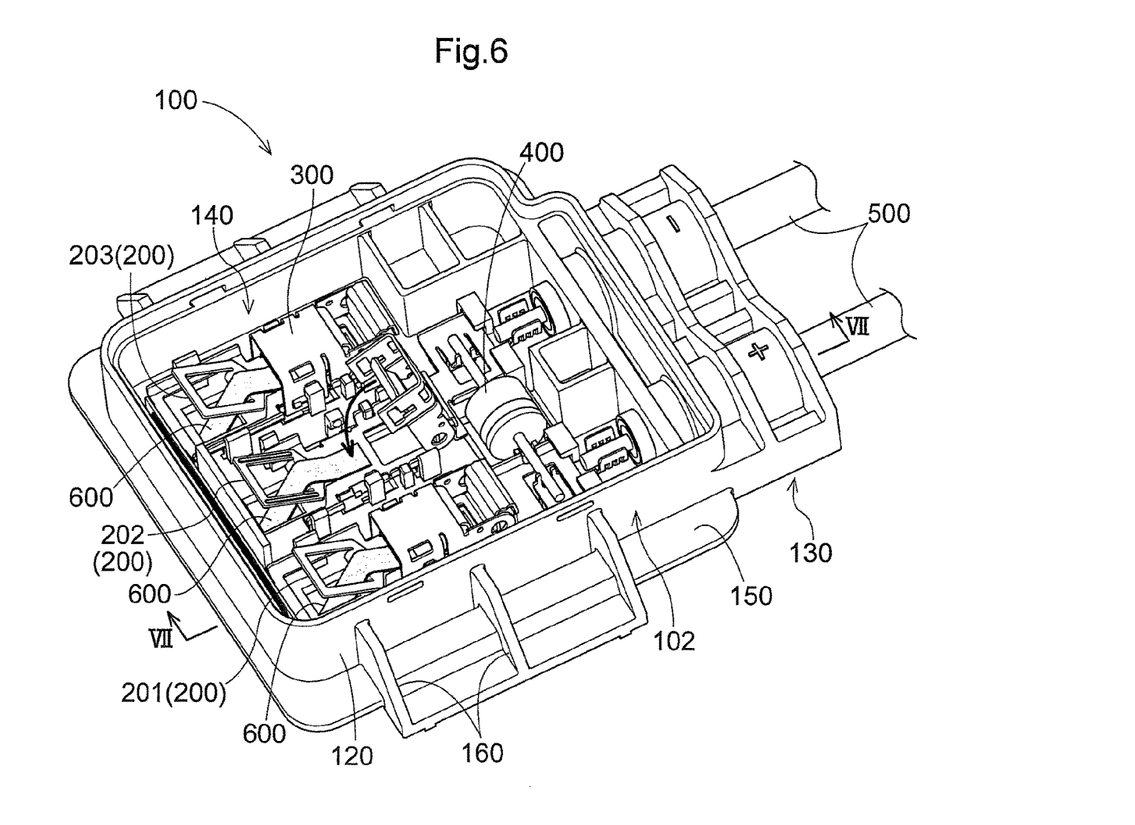
FIG. 6 is a perspective view of the terminal box in which output lines are connected to the terminal strips with play producing portions each forming a first angle.

In connecting the output line 600 to the terminal strip 200, the output line 600 is guided into the housing space 140 through the first tab receiving hole 112 and the first opening 230 with the connecting element 300 being in the open position like the second terminal strip 202 shown in FIG. 6. Then, the leading end of the output line 600 is bent along the guide part 232 to place the output line 600 on the receiving portion 220 of the terminal strip 200. As shown in FIGS. 6 and 7, the play producing portion 210 forms the first angle A relative to the receiving portion 200, and the output line 600 extends to the receiving portion 200 along the slanting surface of the play producing portion 210. More particularly, the output line 600 is smoothly bent at the guide part 232 of the first opening 230 positioned above the receiving portion 220 to extend diagonally downward along the swingable part 214, and then bent at the support part 212 to the horizontal to reach the receiving portion 220.

Next, the connecting element 300 is pivoted from the open position to the fixed position until the engaging parts 222 are fitted to the engageable holes 322. FIG. 6 shows that the first terminal strip 201 and the third terminal strip 203 are in the fixed position. When the connecting element 300 is brought to the fixed position as shown in FIG. 7, the urging element 340 applies the urging force to the output line 600 to allow the output line 600 to be fixedly held between the terminal strip 200 and the connecting element 300 and to be electrically connected to the terminal strip 200.

Next, the frame 216 of the play producing portion 210 is pressed downward with any tool such as a regular (slotted) screwdriver or a suitable jig until the swingable part 214 becomes substantially parallel with the receiving portion 220. While the swingable part 214 is pivoted downward about the support part 212 and move to reduce the first angle A, the output line 600 does not follow the movement of the swingable part 214.

Figure 8:
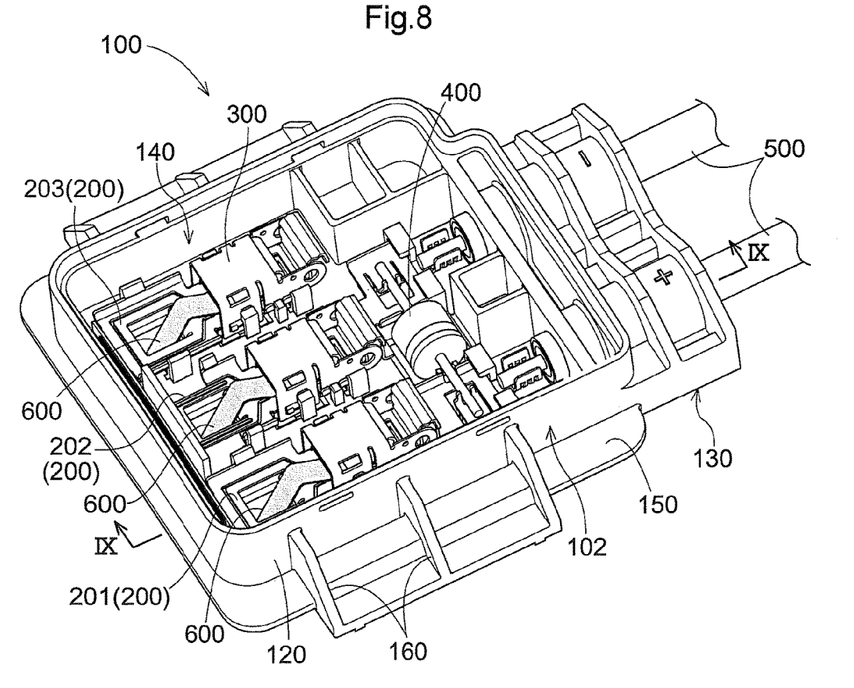
FIG. 8 is a perspective view of the terminal box in which the output lines are connected to the terminal strips with the play producing portions each forming a second angle.
Figure 9:
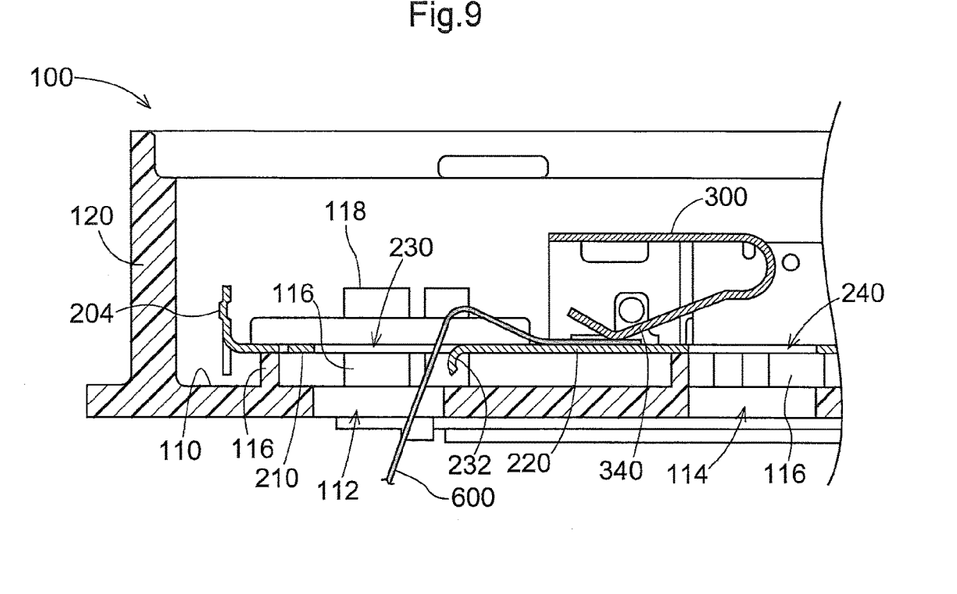
FIG. 9 is a sectional view taken on line IX-IX of FIG. 8.

The depression of the frame 216 causes the support part 212 to plastically deform, which allows the swingable part 214 to be kept substantially parallel with the receiving portion 220 as shown in FIGS. 8 and 9 when the frame 216 is no longer pressed downward. In this state, the output line 600 is out of contact with the first tab receiving hole 112 and the first opening 230 and connected to the terminal strip 200 with the downward slanting portion acting as play.

The swingable part 214 and the receiving portion 220 form a second angle B at a point where the frame 216 is no longer pressed downward. Similarly to the first angle A, the second angle B is also an acute angle formed by the flat surface of the receiving portion 200 and the flat surface of the swingable part 214. The second angle B is smaller than the first angle A. The second angle B is substantially zero with the swingable part 214 being substantially parallel with the receiving portion 220. While the current embodiment refers to the case in which the second angle B is substantially zero with the swingable part 214 being substantially parallel with the receiving portion 220, the second angle B may be greater or smaller than zero if it is smaller than the first angle A and provides a required length of play.

The output line 600 is connected to the terminal strip 200 with the play when the swingable part 214 is substantially parallel with the receiving portion 220. Thus, the play can absorb longitudinal shrinkage or expansion of the output line 600 caused by a change in temperature in the solar cell module or other factors. As a result, no stress is applied and no poor contact occurs between the output line 600 and the terminal strip 200 when the output line 600 shrinks or expands, which maintains a stable contact state therebetween.

As described above, a certain length of play may be easily and surely yielded in the output line 600 by providing the play producing portion 210 in the terminal strip 200, fixing the output line 600 to the receiving portion 220 with the swingable part 214 of the play producing portion 210 inclining by the first angle A relative to the receiving portion 220, and then causing the swingable part 214 to be substantially parallel with the receiving portion 220 by depression. When an operator working at a job site attempts to manually create a certain length of play in the output line, he or she may forget to create such play or may produce variations in creating the play. The terminal box according to the current embodiment can eliminate such a disadvantage and stably maintain the good quality of the terminal box when attached to the solar cell module. Further, the operator can visually confirm that the swingable part 214 inclines relative to the receiving portion 220 with the first angle A or substantially parallel with the receiving portion 220 to recognize the play, he or she may securely produce the play by causing the swingable part 214 to be substantially parallel with the receiving portion 220 if the swingable part 214 still inclines relative to the receiving portion 220 with the first angle A. This can prevent the operator from forgetting to create the play or to depress the frame 216.

In the current embodiment, the swingable part 214 is pressed downward to be substantially parallel with the receiving portion 220. In some cases, however, the terminal strip 200 may be made of a material that elastically deforms the support part 212 with the depression of the frame 216 but allows the swingable part 214 to slightly return from its parallel position by the spring-back action of the material when the depression of the frame 216 is ceased, which may cause the second angle to be larger than zero.

When the second angle needs to be substantially zero to provide a required length of play, the frame 216 may be depressed until the swingable part 214 goes down opposite (below) the receiving portion 220. In the main body 100, the terminal strip 200 is spaced apart upward from the bottom wall 110 and no projections 116 or no pawls 118 are provided under the swingable part 214 (see FIGS. 2 and 3), which allows the swingable part 214 to be depressed below the receiving portion 220. As a result, the second angle may be substantially zero even when the swingable part 214 springs back. Further, if the swingable part 214 springs back a little to cause the second angle to be smaller than zero, i.e. to be a negative angle, there is no problem if necessary play is provided.

In the current embodiment, the output line 600 is introduced through the first opening 230 defined by the play producing portion 210. Instead, the output line 600 may be introduced and fixed to the receiving portion 220 through the second opening 240, if preferable. In that case, however, no play producing portion 210 is provided in the second opening 240, which requires the operator to manually create the play.

What is claimed is:

1. A terminal box comprising:
a terminal strip connected to an output line that takes out electric power generated at a solar cell module; and
a main body housing the terminal strip,
wherein the terminal strip includes a connecting portion electrically connected to the output line, and a play producing portion extending in a direction opposite the connecting portion from a support part provided in an end portion of the connecting portion, the play producing portion having an opening receiving the output line, the support part acting as a support point at which the play producing portion changes its angle relative to the connecting portion,
wherein the main body includes a receiving hole formed at a position corresponding to the opening for receiving the output line,
wherein the play producing portion inclines relative to the connecting portion by a first angle with the output line being inserted through the receiving hole and the opening to be connected to the connecting portion, and
wherein the play producing portion inclines relative to the connecting portion by a second angle smaller than the first angle with the output line being connected to the connecting portion.

2. The terminal box according to claim 1, wherein the play producing portion has a cantilever shape with the support part being a fixed end, and has a width smaller at the support part than a width at a part forming the opening.

3. The terminal box according to claim 2, wherein the opening is rectangular and has a guide part formed in one of four sides of the opening that is closest to the connecting portion for guiding the output line to the connecting portion.

4. The terminal box according to claim 1, wherein the opening is rectangular and has a guide part formed in one of four sides of the opening that is closest to the connecting portion for guiding the output line to the connecting portion.

5. A method of connecting an output line that takes out electric power generated at a solar cell module to a terminal strip housed in a main body included in a terminal box, the terminal strip including a connecting portion electrically connected to the output line, and a play producing portion extending in a direction opposite the connecting portion from a support part provided in an end portion of the connecting portion, the play producing portion having an opening receiving the output line, the support part acting as a support point at which the play producing portion changes its angle relative to the connecting portion, the main body including a receiving hole formed at a position corresponding to the opening for receiving the output line, the method comprising the steps of:
inserting the output line through the receiving hole and the opening to connect the output line to the connecting portion with the play producing portion inclining relative to the connecting portion by a first angle; and
moving the play producing portion relative to the connecting portion by a second angle smaller than the first angle to produce play in the output line.

* * * * *